(12) United States Patent
Kobayashi et al.

(10) Patent No.: US 7,184,257 B2
(45) Date of Patent: *Feb. 27, 2007

(54) SOLID ELECTROLYTIC CAPACITOR

(75) Inventors: Masaaki Kobayashi, Tokyo (JP);
Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/546,775

(22) PCT Filed: Feb. 26, 2004

(86) PCT No.: PCT/JP2004/002247

§ 371 (c)(1),
(2), (4) Date: Mar. 22, 2006

(87) PCT Pub. No.: WO2004/077466

PCT Pub. Date: Sep. 10, 2004

(65) Prior Publication Data

US 2006/0198083 A1    Sep. 7, 2006

(30) Foreign Application Priority Data

Feb. 26, 2003  (JP)  ............................. 2003-049865

(51) Int. Cl.
*H01G 4/228*  (2006.01)
*H01G 9/04*  (2006.01)
(52) U.S. Cl. ...................... 361/540; 361/533; 361/529
(58) Field of Classification Search ........ 361/528–529, 361/532–533, 539–541
See application file for complete search history.

(56) References Cited

U.S. PATENT DOCUMENTS

| 5,638,253 | A | * | 6/1997 | Hasegawa ................... 361/535 |
| 5,880,925 | A |   | 3/1999 | DuPre et al. |
| 6,243,253 | B1 |   | 6/2001 | DuPre et al. |
| 6,346,127 | B1 | * | 2/2002 | Kuriyama .................. 29/25.03 |
| 6,870,728 | B1 | * | 3/2005 | Burket et al. ............... 361/538 |

FOREIGN PATENT DOCUMENTS

| JP | A 06-267801 | 9/1994 |
| JP | A 06-267802 | 9/1994 |
| JP | A 10-163072 | 6/1998 |
| JP | A 11-288846 | 10/1999 |
| JP | A 2000-311832 | 11/2000 |
| JP | A 2002-025858 | 1/2002 |

\* cited by examiner

*Primary Examiner*—Eric W. Thomas
(74) *Attorney, Agent, or Firm*—Oliff & Berridge, PLC

(57) ABSTRACT

A solid electrolytic capacitor includes a capacitor element and a board mounting the capacitor element thereon. The capacitor element includes a support made of a valve metal, and an anode and a cathode provided on the support. Anode and cathode lead conductors connected to the anode and the cathode are provided on a first principal surface of the support, and anode and cathode lands are formed on a second principal surface. A conductive portion passing through the board electrically connects either the anode lead conductor to the anode land or the cathode lead conductor to the cathode land.

21 Claims, 9 Drawing Sheets

SOLID ELECTROLYTIC CAPACITOR

TECHNICAL FIELD

The present invention relates to a solid electrolytic capacitor.

BACKGROUND ART

Solid electrolytic capacitors use for their anodes a metal that can form an electrically insulating oxide film thereon, such as aluminum, titanium, brass, nickel, or tantalum, i.e., so-called valve metal. On the surface of the valve metal, the insulating oxide film is provided by anodizing the surface. Thereafter, a solid electrolyte layer substantially functioning as a cathode is formed on the oxide film. The solid electrolyte layer is made of a material such as an organic compound. Also, an electrically conductive layer made of a material such as graphite or silver is provided as a cathode on the solid electrolyte layer. The solid electrolytic capacitor is manufactured through these processes.

In order to reduce the impedance of the solid electrolytic capacitor, it is necessary to lower ESL (equivalent series inductance) and ESR (equivalent series resistance). In particular, for achieving high-frequency operations, it is necessary to keep the ESL low. In general, the following methods for lowering the ESL are known: first, setting the length of a current path as short as possible, second, canceling out a magnetic field formed by a current path by that formed by another current path, and third, dividing a current path into N paths so that the effective ESL becomes 1/N. For example, the invention disclosed in Japanese Patent Application Laid-Open No. 2000-311832 employs the first and third methods. The invention disclosed in Japanese Patent Application Laid-Open No. HEI 06-267802 employs the second and third methods. The inventions disclosed in Japanese Patent Applications Laid-Open Nos. HEI 06-267801 and HEI 11-288846 employ the third method.

DISCLOSURE OF THE INVENTION

As power supply circuits used in electronic elements have been attaining higher frequencies, there have been more demands for reducing the ESL (series equivalent inductance), i.e., lowering the impedance, of solid electrolytic capacitors employed in these circuits. In each of the above-mentioned solid electrolytic capacitors, a capacitor and a circuit board that mounts the capacitor thereon are usually connected to each other with a long lead member extending from the capacitor. As a consequence, impedance inevitably increases in this lead member. Namely, the lead member extending from the capacitor to the circuit board is required to be bent at one or more positions in order to connect the capacitor to the circuit board. Consequently, the electrical conduction distance becomes longer.

In view of the above, it is an object of the present invention to reduce the impedance of a solid electrolytic capacitor.

In one aspect, the present invention relates to a solid electrolytic capacitor. The solid electrolytic capacitor comprises a capacitor element, and a board having a first principal surface on which the capacitor element is mounted and a second principal surface opposing the first principal surface. The capacitor element includes an anode and a cathode. The anode and the cathode may be provided on a support made of a valve metal. The anode may be made of a valve metal as well. The cathode may include a solid polymer electrolyte layer and an electrical conductor layer which are laminated on the support. An anode lead conductor electrically connected to the anode and a cathode lead conductor electrically connected to the cathode are provided on the first principal surface. Anode and cathode lands are formed on the second principal surface at positions corresponding to the anode and cathode lead conductors, respectively. The board includes at least one of first and second conductive portions both passing through the board. The first conductive portion electrically connects the anode lead conductor to the anode land. The second conductive portion electrically connects the cathode lead conductor to the cathode land.

The first conductive portion may include a hole passing through the board; and an electrical conductor disposed in the hole to extend between the anode lead conductor and the anode land. The second conductive portion may include a hole passing through the board, and an electrical conductor disposed in the hole to extend between the cathode lead conductor and the cathode land.

A plurality of the capacitor elements may be disposed adjacent to each other. These capacitor elements may include the anodes electrically connected to each other and the cathodes electrically connected to each other.

The anodes of the capacitor elements may be electrically connected to each other via a valve metal. The valve metal may include a portion held between the anodes of the capacitor elements, and include a portion connected to the anode lead conductor.

The cathodes of the capacitor elements may be electrically connected to each other with an electrically conductive adhesive.

The present invention will be more fully understood from the following detailed descriptions and the accompanying drawings. The accompanying drawings are only illustrative and are not intended to limit the scope of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BEST MODES FOR CARRYING OUT THE INVENTION

In the following, the embodiments of the invention will be explained in detail with reference to the accompanying drawings. In the explanation of the drawings, identical symbols are used to designate identical elements without repeating their overlapping descriptions.

First Embodiment

Figure 1:
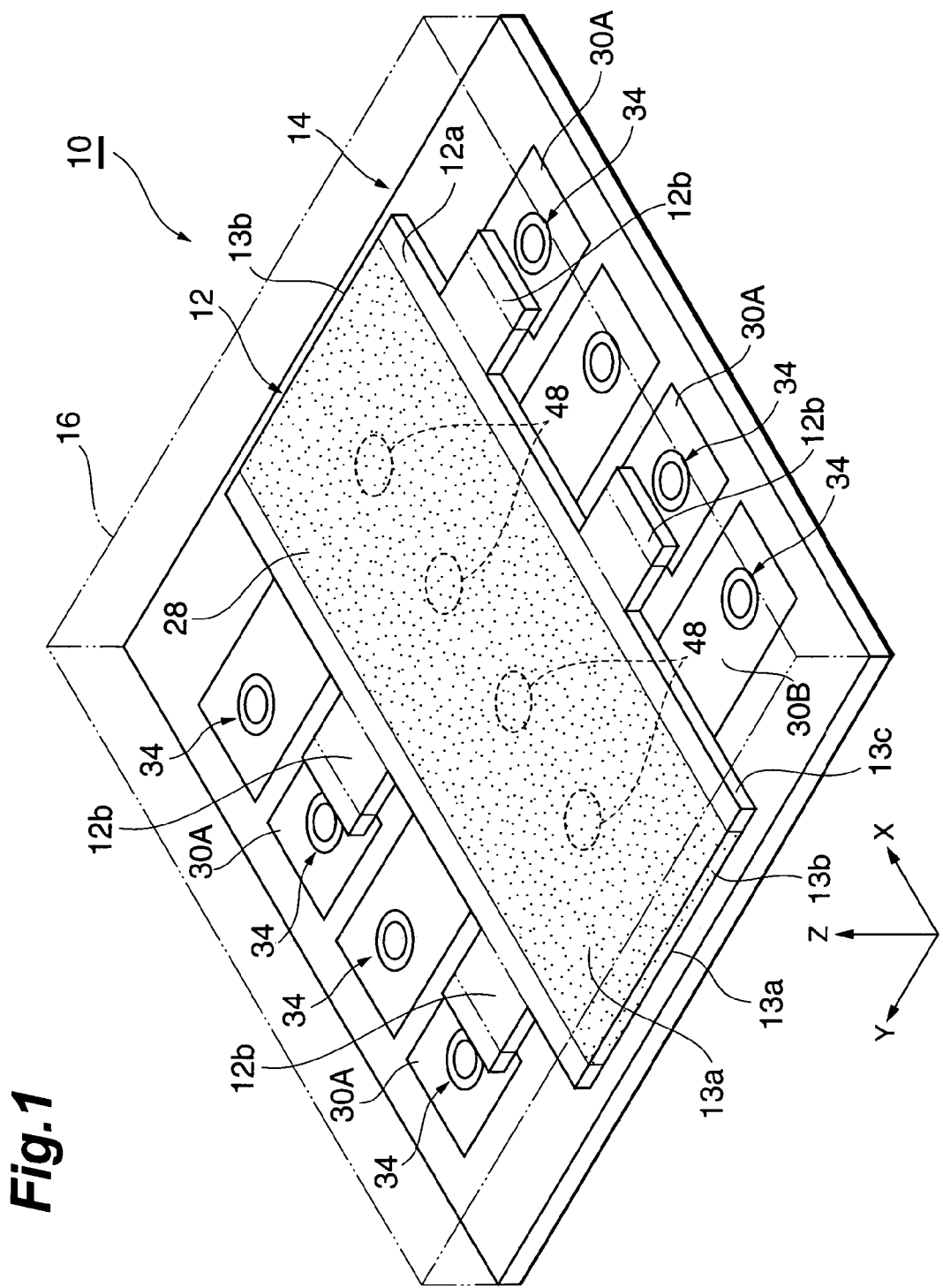
FIG. 1 is a perspective view showing a first embodiment of the solid electrolytic capacitor in accordance with the invention.

FIG. 1 is a perspective view showing a first embodiment of the solid electrolytic capacitor in accordance with the invention. As shown in FIG. 1, a solid electrolytic capacitor 10 has a capacitor element 12, a thin, rectangular board 14 on which the capacitor element 12 is mounted, and a resin mold 16 for molding the capacitor element 12 and the board 14.

Figure 2:
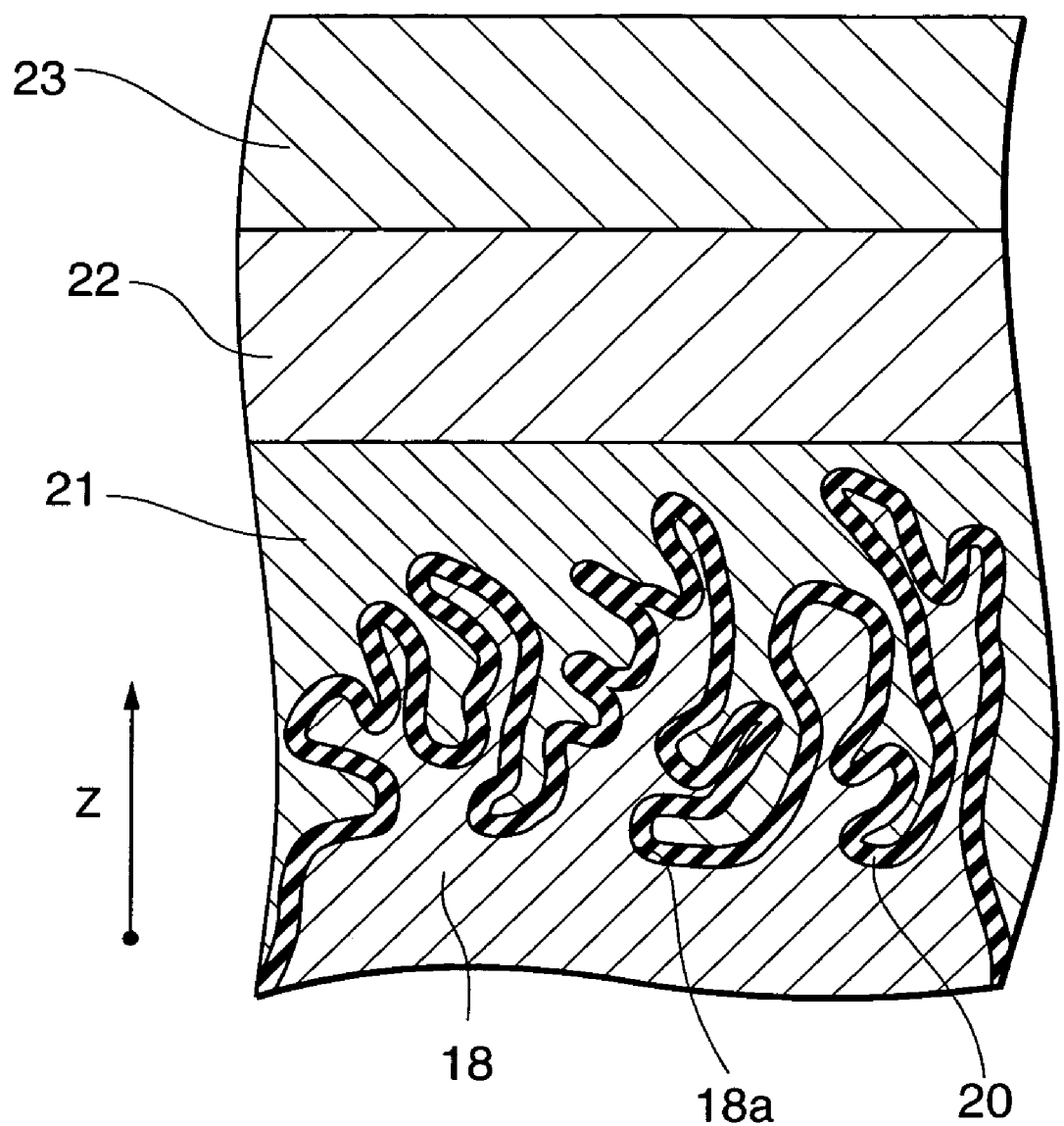
FIG. 2 is a schematic sectional view showing a main portion of the solid electrolytic capacitor shown in FIG. 1.

The capacitor element 12 has a structure in which a solid polymer electrolyte layer and an electrical conductor layer are successively laminated on part (which will be explained later) of a foil-like aluminum support (valve metal support). The surface of the aluminum support is roughened (or the surface area of the aluminum support is increased) as well as subjected to chemical conversion treatment. The structure of the capacitor element 12 will be explained in more detail with reference to FIG. 2. FIG. 2 is a schematic sectional view showing a major portion of the solid electrolytic capacitor 10 shown in FIG. 1. As shown in FIG. 2, on the surface 18a of the aluminum support 18 (having a thickness of 100 μm) roughened by etching, an electrically insulating aluminum oxide film 20 is formed by chemical conversion, i.e., anodization. The depressions of the roughened aluminum support 18 are filled with a solid polymer electrolyte layer 21 containing an electrically conductive polymer compound. The solid polymer electrolyte layer 21 fills the depressions of the aluminum support 18 while in a monomer state, and then is polymerized by chemical oxidation or electrolytic oxidation.

A graphite paste layer 22 and a silver paste layer 23 (electrical conductor layer) are successively formed on the solid polymer electrolyte layer 21 by any of screen printing, dipping (dip molding), and spray coating. The solid polymer electrolyte layer 21, the graphite paste layer 22, and the silver paste layer 23 construct a cathode 28 of the capacitor element 12.

As shown in FIG. 1, the capacitor element 12 includes an electrical storage 12a shaped in a thin, rectangular plate, and a plurality of thin anodes 12b protruding outward from two longer side faces 13c of the electrical storage 12a. These anodes 12b form an even number of pairs (two pairs in FIG. 1). For convenience of explanation, the longer side direction of the electrical storage 12a will be defined as X direction, the shorter side direction of the electrical storage 12a will be defined as Y direction, and the direction orthogonal to the X and Y directions will be referred to as Z direction in the following.

The electrical storage 12a is mainly constituted by the aluminum support 18. The cathode 28 is disposed on almost whole of the principal surfaces 13a and X-directional end faces (two shorter side faces) 13b of the electrical storage 12a. The cathode 28 is configured of the above-mentioned solid polymer electrolyte layer 21, graphite paste layer 22, and silver paste layer 23. The anodes 12b are protrusions of the aluminum support 18. A pair of the anodes 12b are formed on each of the longer side faces 13c of the electrical storage 12a, while each extending in Y direction. When the capacitor element 12 is viewed from thereabove along Z direction, the four anodes 12b are arranged symmetrically about the center of gravity of the electrical storage 12a. Here, the "center of gravity" refers to a point at which diagonal lines of the principal surface 13a of the electrical storage 12a intersect on the principal surface 13a. In such an arrangement of the anodes 12b, the arrangement of polarities of the capacitor element 12 will not change even if the capacitor element 12 is rotated by 180 degrees about an axis extending in Z direction through the center of gravity on mounting the capacitor element 12 onto the board 14. As a result, the capacitor element 12 can be prevented from being connected to electrodes on the board 14 with wrong polarities on mounting the capacitor element 12 onto the board 14.

The capacitor element 12 having the shape mentioned above is manufactured by punching out an aluminum foil having a roughened and chemically converted surface. The punched-out aluminum foil is dipped in a chemical converting liquid, whereby an electrically insulating aluminum oxide film is formed on not only the principal surfaces but also side faces of the aluminum foil. The aluminum support 18 is obtained in this way. A preferred example of the chemical converting liquid is an aqueous solution of ammonium adipate having a concentration of 3%.

Figure 3:
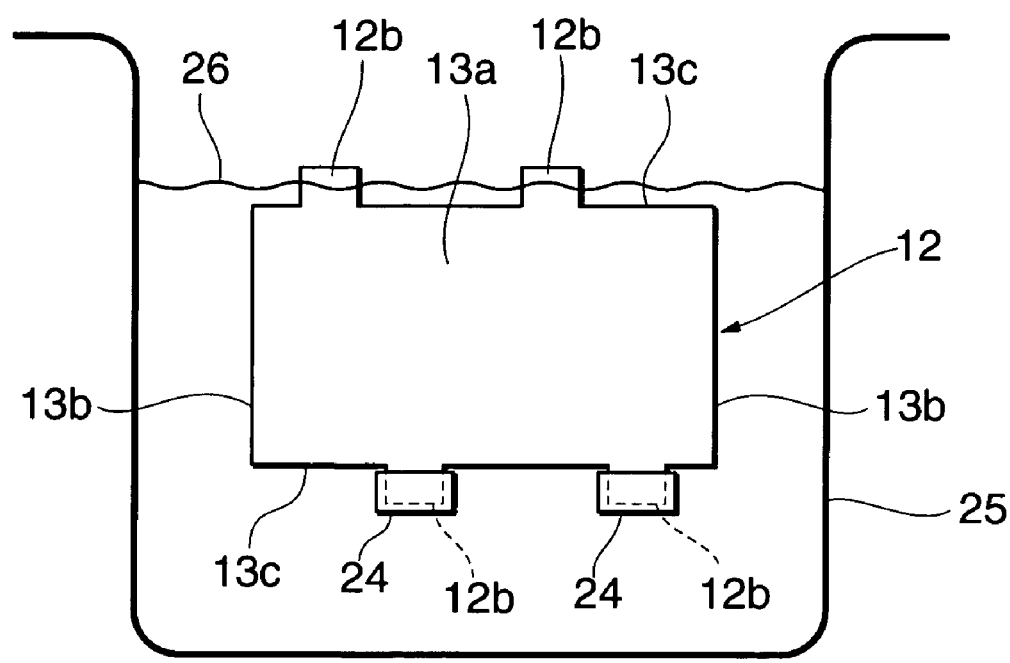
FIG. 3 is a schematic view showing an anodization treatment.

The treatment for the capacitor element 12 will now be explained with reference to FIG. 3. FIG. 3 shows anodization treatment for the capacitor element 12 before providing the capacitor element 12 with the cathode 28. First, the anodes 12b provided on one of the side faces 13c of the capacitor element 12 are masked with a thermosetting resist 24. Subsequently, the capacitor element 12 is dipped into a chemical converting liquid 26 made of the aqueous solution of ammonium adipate in a stainless beaker 25 while the anodes 12b provided on the opposite side face 13c are supported. Then, a voltage is applied between the supported anodes 12b as a positive electrode and the stainless beaker 25 as a negative electrode. The voltage can appropriately be determined according to the desired thickness of the aluminum oxide film. When forming an aluminum oxide film 20 having a thickness of 10 nm to 1 μm, a voltage on the order of several to 20 volts is applied in general. When the anodization starts with the voltage application, the chemical converting liquid 26 climbs the roughened surface of the capacitor element 12 because of capillary action. As a result, the aluminum oxide film 20 is formed on the whole roughened surface of the capacitor element 12 including the side faces thereof. Thereafter, the cathode 28 is provided on the capacitor element 12 by a known method.

Figure 4:
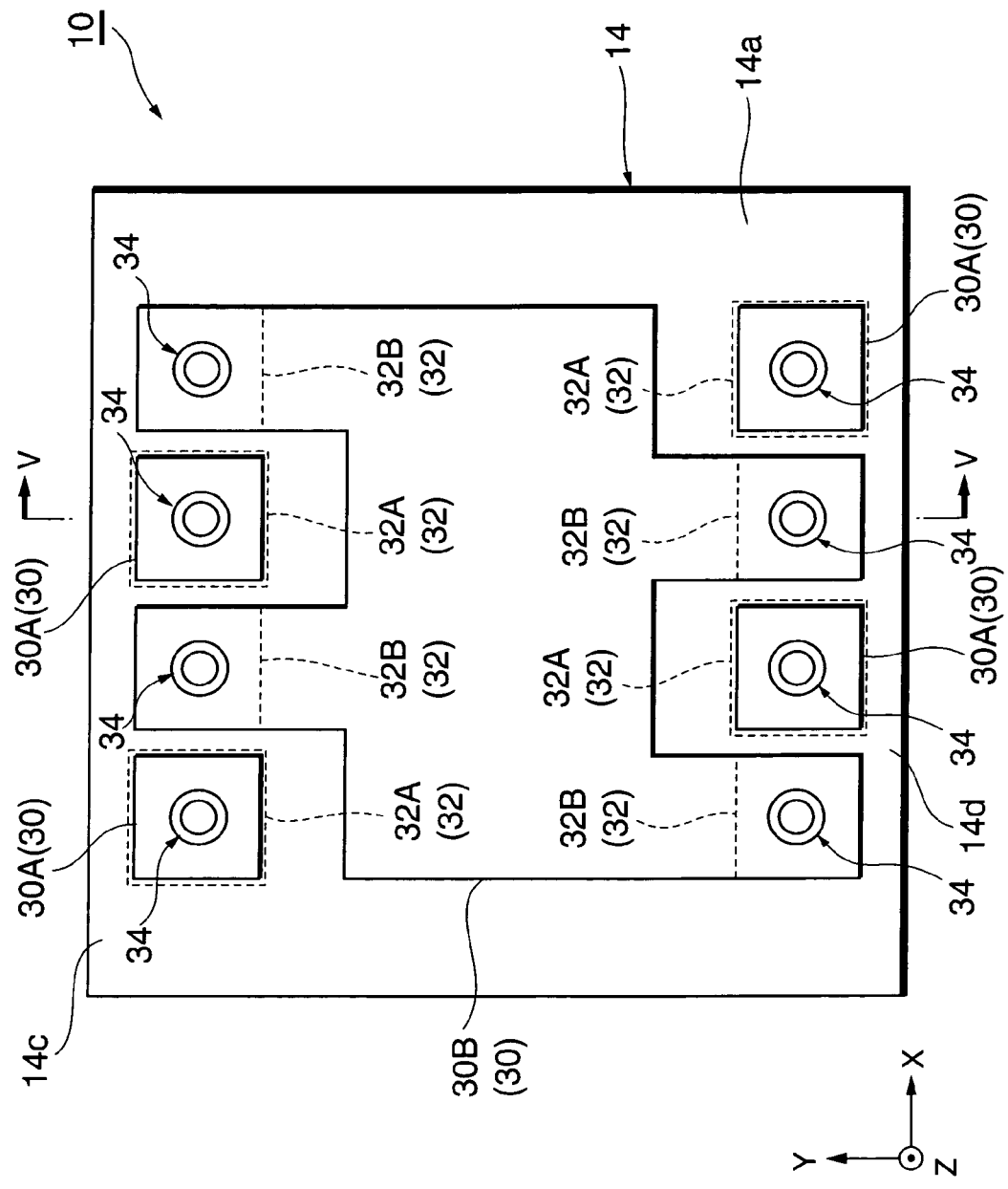
FIG. 4 is a plan view of the board shown in FIG. 1.
Figure 5:
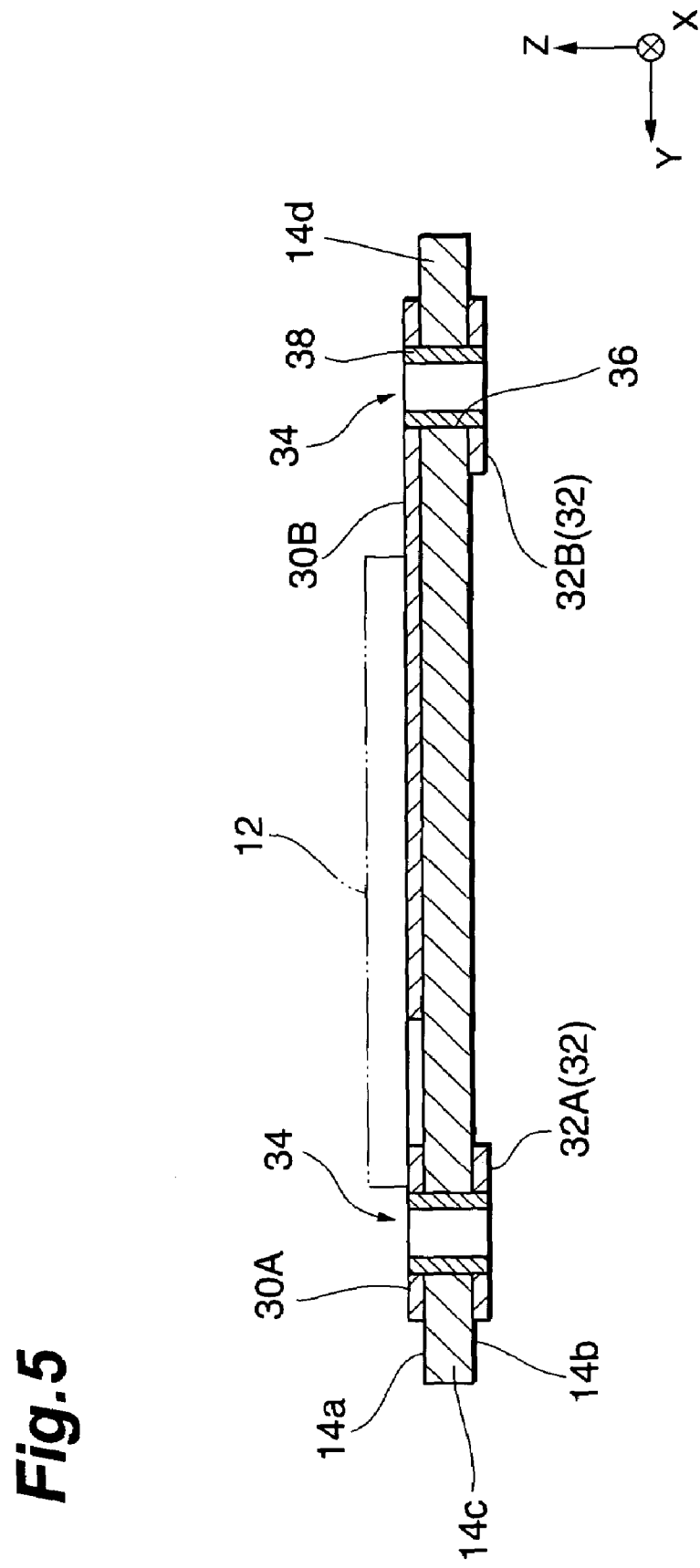
FIG. 5 is a sectional view taken along line V—V of FIG. 4.

FIG. 4 is a plan view of the board 14 shown in FIG. 1, whereas FIG. 5 is a sectional view taken along the line V—V of FIG. 4. The board 14 is a printed wiring board made of an FR4 material (epoxy resin material). As shown in FIGS. 4 and 5, lead conductors 30 made of copper are printed on the upper face 14a of the board 14, and land electrodes 32 made of copper are printed on the lower face 14b. Also, the board 14 is provided with via holes (electrically conductive portions) 34 for electrically connecting the copper lead conductors 30 to the land electrodes 32. Each of these via holes 34 has a hole 36 passing through the board 14 in the thickness direction thereof (Z direction in the drawings) and having the inner surface plated with copper (electrical conductor) 38. Four via holes 34 are equidistantly arranged along X direction on each of opposing end portions 14c and 14d of the board 14. The via holes 34 on one of the end portions are paired with their corresponding via holes 34 on the other end portion. Each pair of via holes 34 align in Y direction. Each via hole 34 may be obtained by drilling a through hole 36 in the board 14 and then electrolessly plating the surface of the through hole 36 with the copper 38.

Eight rectangular land electrodes 32 are provided about respective ends of the via holes 34 exposed on the board lower face 14b. The land electrodes 32 are electrically connected to their respective via holes 34. The land electrodes 32 include anode land electrodes 32A and cathode land electrodes 32B. One of the two land electrodes 32 connected to the above-mentioned pair of via holes 34 is the anode land electrode 32A, and the other is the cathode land electrode 32B. The four land electrodes 32 formed on each of the end portions 14c and 14d are arranged so that the anode land electrodes 32A and the cathode land electrodes 32B alternate with each other.

The lead conductors 30 are formed about their respective ends of the via holes 34 exposed on the board upper face 14a. The lead conductors 30 include anode lead conductors 30A and a cathode lead conductor 30B. The anode lead conductors 30A and the cathode lead conductor 30B are electrically connected to their corresponding via holes 34. The cathode lead conductor 30B is integrally formed so as to include surroundings of the respective ends of the four via holes 34 electrically connected to the cathode land electrodes 32B, and to include the central portion of the board upper face 14a. The anode lead conductors 30A are formed about the four via holes 34 electrically connected to the anode land electrodes 32A, respectively, and each have a rectangular shape as with the land electrodes 32. The single cathode lead conductor 30B is electrically insulated from the four anode lead conductors 30A.

A method of manufacturing the solid electrolytic capacitor 10 by mounting the capacitor element 12 onto the board 14 will now be described with reference to FIGS. 1 and 4.

On mounting the capacitor element 12 onto the board 14, the anodes 12b of the capacitor element 12 are electrically connected to the anode lead conductors 30A disposed on the board 14 at the positions corresponding to the anodes. This electrical connection is achieved by a metal welding method such as resistance welding or YAG laser spot welding. As a result, the aluminum support 18 (see FIG. 2) of the anodes 12b is electrically connected to the anode lead conductors 30A. Accordingly, by way of the four via holes 34, the aluminum support 18 is electrically connected to the four anode land electrodes 32A formed on the board lower face 14b. When mounting the capacitor element 12 onto the board 14, the silver paste layer 23 (see FIG. 2), which is the uppermost layer of the cathode 28, is electrically connected to the cathode lead conductor 30B with an electrically conductive adhesive 48. Therefore, by way of the four via holes 34, the cathode 28 (i.e., solid polymer electrolyte layer 21, graphite paste layer 22, and silver paste layer 23) is electrically connected to the four cathode land electrodes 32B formed on the board lower face 14b. After the capacitor element 12 is mounted on the board 14 by the above-mentioned method, the resin mold 16 is formed by injection or transfer molding. The resin mold 16 is an epoxy resin covering both the board 14 and the capacitor element 12.

In the solid electrolytic capacitor 10, as explained in detail in the foregoing, the via holes 34 linearly extending in the thickness direction (Z direction in the drawings) connect the lead conductors 30 to the land electrodes 32. When terminals on a circuit board (not shown in the drawings) for mounting the solid electrolytic capacitor 10 thereon are electrically connected to their corresponding lands 32A, 32B of the solid electrolytic capacitor 10, an electric power is supplied from the circuit board to the capacitor element 12 through the via holes 34. Therefore, as compared with a solid electrolytic capacitor in which an electric power is supplied to a capacitor element through a lead member having a bent portion, the conduction distance from the terminals on the circuit board to the electrodes (anodes 12b and cathode 28) of the capacitor element 12 becomes shorter, whereby the equivalent series inductance is accordingly reduced. As the equivalent series inductance decreases, the impedance becomes lower. The decrease in the equivalent series inductance and the impedance allows the solid electrolytic capacitor 10 to be easily adapted to high-frequency operations, while achieving increased current capacity and suppressed heat production. Therefore, the solid electrolytic capacitor 10 can be employed in circuits disposed on the primary or secondary side of a power supply, through which circuits a relatively large current flows.

Second Embodiment

A second embodiment of the solid electrolytic capacitor in accordance with the present invention will now be explained.

Figure 6:
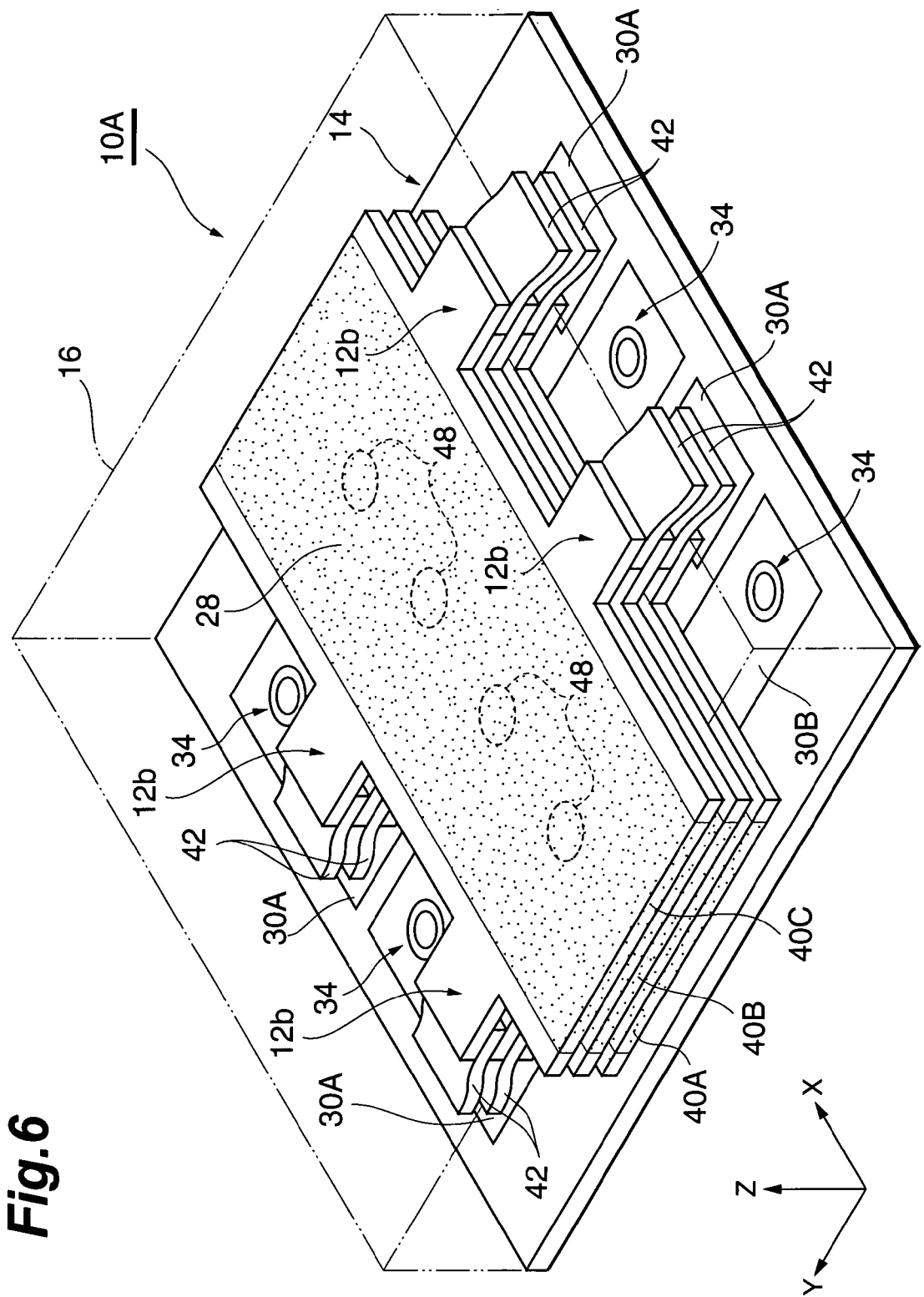
FIG. 6 is a perspective view showing a second embodiment of the solid electrolytic capacitor in accordance with the invention.

FIG. 6 is a perspective view showing a solid electrolytic capacitor 10A in accordance with the second embodiment. As shown in FIG. 6, the solid electrolytic capacitor 10A differs from the above-mentioned solid electrolytic capacitor 10 only in that it comprises three capacitor elements 12 each of which is mentioned above. In the solid electrolytic capacitor 10A, the three capacitor elements 40A, 40B, and 40C are overlaid on each other. Among the three capacitor elements 40A, 40B, and 40C, the lowermost capacitor element 40A is mounted on the board 14 by a method similar to that for the above-mentioned capacitor element 12.

In the lowermost capacitor element 40A and the middle capacitor element 40B overlaid thereon, the respective cathodes 28 are electrically connected to each other with an electrically conductive adhesive 48, whereas the respective anodes 12b are electrically connected to each other via valve metal foils 42. Each valve metal foil (valve metal body) 42 is an aluminum foil having unroughened surfaces, and is connected to its corresponding anodes 12b by ultrasonic welding. This reliably establishes the electrical connection between the anodes 12b made of a valve metal. Joining the valve metal foils 42 to the anode lead conductors 30A by YAG laser spot welding electrically connects the respective aluminum supports of the middle capacitor element 40B and the uppermost capacitor element 40C to the anode lead conductors. The method of connecting the valve metal foils 42 to the anodes 12b may be fixing by caulking using cold pressure welding, and the method of connecting the valve metal foils 42 to the anode lead conductors 30A may be resistance welding.

When terminals on a circuit board (not shown in the drawings) for mounting the solid electrolytic capacitor 10A thereon are electrically connected to their respective land electrodes 32A and 32B of the solid electrolytic capacitor 10A, an electric power is supplied not only to the lowermost capacitor element 40A but also to the middle capacitor element 40B and the uppermost capacitor element 40C. As a consequence, the solid electrolytic capacitor 10A has a capacitance which is about three times as large as that of the solid electrolytic capacitor 10 having one capacitor element 12.

In the solid electrolytic capacitor 10A, the via holes 34 linearly extending in the thickness direction (Z direction in the drawing) of the board 14 connect the lead conductors 30 to the land electrodes 32. Therefore, as compared with a solid electrolytic capacitor in which an electric power is supplied to a capacitor element through a lead member having a bent portion, the conduction distance from the terminals on the circuit board to the electrodes (anodes 12b and cathode 28) of the capacitor element 12 becomes shorter, whereby the equivalent series inductance and impedance are accordingly reduced.

The solid electrolytic capacitor 10A includes three capacitor elements; however, the number of capacitor elements may be increased as appropriate. In this case, the capacitance increases in proportion to the increased number of capacitor elements used in the capacitor. The respective cathodes 28 of the capacitor elements overlaid on each other can easily be electrically connected to each other with the conductive adhesive 48.

Third Embodiment

A third embodiment of the solid electrolytic capacitor in accordance with the present invention will now be explained.

Figure 7:
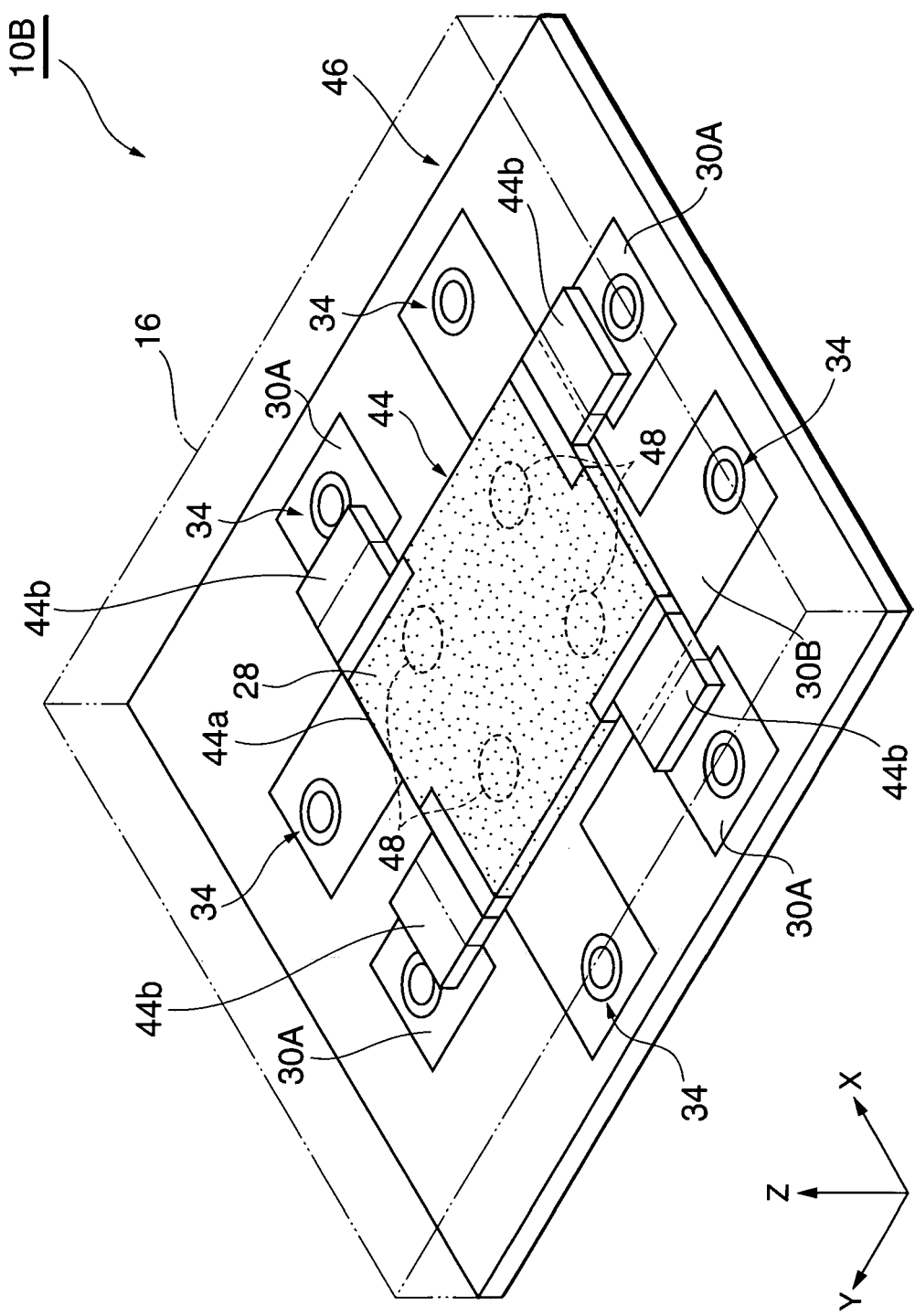
FIG. 7 is a perspective view showing a third embodiment of the solid electrolytic capacitor in accordance with the invention.
Figure 8:
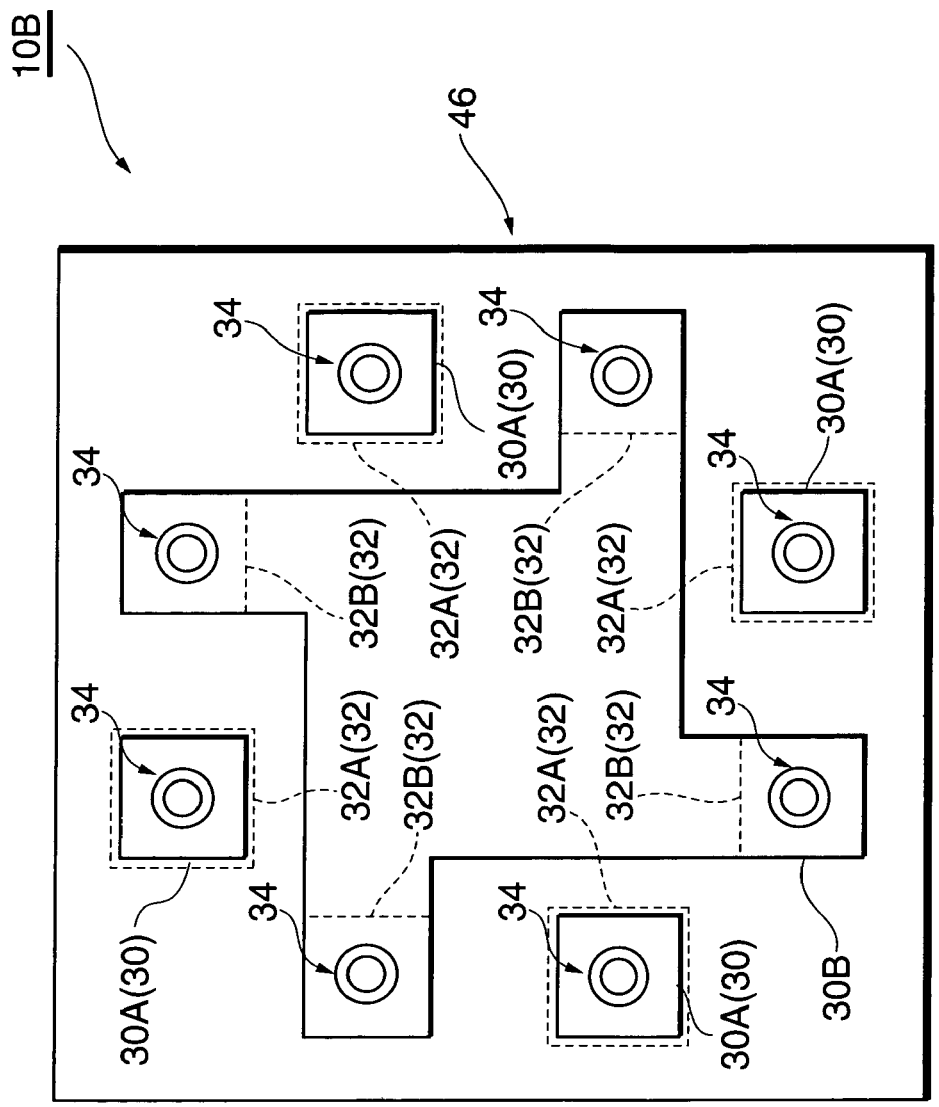
FIG. 8 is a plan view of the board shown in FIG. 7.

FIG. 7 is a perspective view showing a solid electrolytic capacitor in accordance with the third embodiment, and FIG. 8 is a plan view of the board shown in FIG. 7. As shown in FIGS. 7 and 8, this solid electrolytic capacitor 10B differs from the above-mentioned solid electrolytic capacitor 10 only in that the capacitor element has a different form, and in that the lead conductors, via holes, and land electrodes of the board are arranged differently. Namely, the capacitor element 44 of the solid electrolytic capacitor 10B is configured of an electrical storage 44a and four thin anodes 44b outwardly protruding from respective four side faces of the electrical storage 44a. The above-mentioned cathode 28 is formed on almost whole of the principal surfaces and the side faces of the electrical storage 44a. When the capacitor element 44 is viewed from thereabove along Z direction, the anodes 44b are arranged symmetrically about the center of gravity of the electrical storage 44a while being placed adjacent to the corners of the capacitor element 44. The capacitor element 44 having the shape mentioned above is manufactured by punching out an aluminum foil having a roughened and chemically converted surface as with the capacitor element 12. The punched-out aluminum foil is dipped in a chemical converting liquid, whereby an insulating aluminum oxide film is formed on not only the principal surfaces but also side faces of the aluminum foil.

Figure 9:
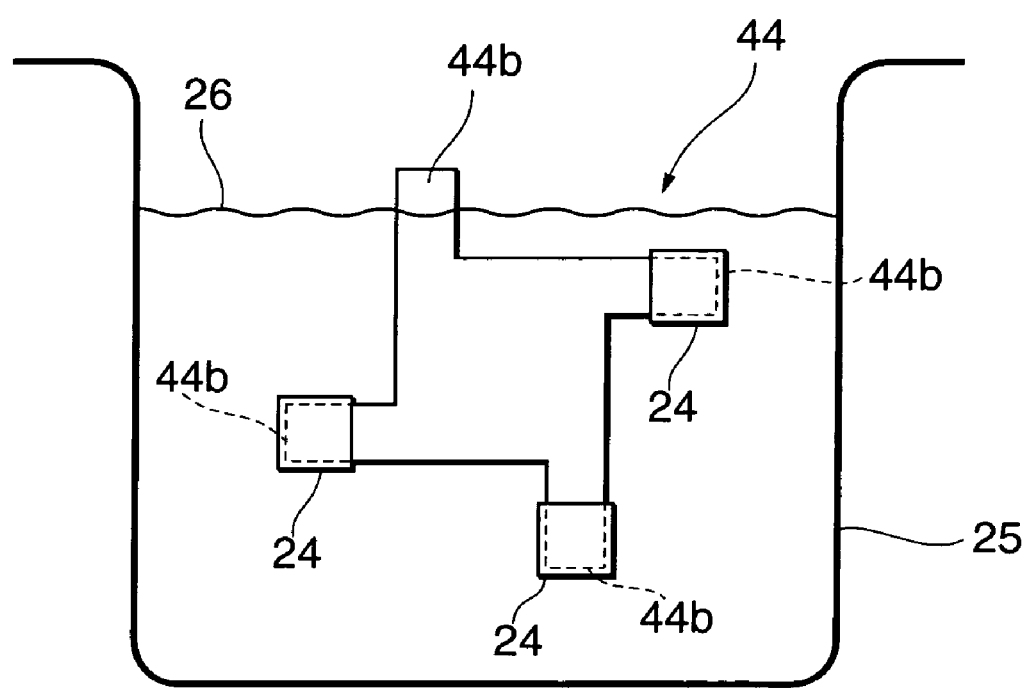
FIG. 9 is a schematic view showing an anodization treatment.

With reference to FIG. 9, the treatment for the capacitor element 44 will now be described. FIG. 9 shows an anodization treatment for the capacitor element 44 before providing the cathode 28 thereon. First, three of the anodes 44b of the capacitor element 12 are masked with a thermosetting resist 24. Subsequently, the capacitor element 44 is dipped into a chemical converting liquid 26 made of an aqueous solution of ammonium adipate contained in a stainless beaker 25 while the anode 44b not masked with the thermosetting resist is supported. Then, a voltage is applied between the supported anode 44b as a positive electrode and the stainless beaker 25 as a negative electrode. The voltage can appropriately be determined according to the desired thickness of the aluminum oxide film. When forming an aluminum oxide film 20 having a thickness of 10 nm to 1 μm, a voltage on the order of several to 20 volts is applied in general. When the anodization starts with the voltage application, the chemical converting liquid 26 climbs the roughened surface of the capacitor element 44 because of capillary action. As a result, the aluminum oxide film 20 is formed on the whole roughened surface of the capacitor element 44 including the side faces thereof. Thereafter, the cathode 28 is provided on the capacitor element 44 by a known method.

The solid electrolytic capacitor 10B includes a thin, square board 46. The board 46 is formed with eight via holes 34 each extending in the thickness direction (Z direction in the drawings) of the board 46. These via holes 34 are arranged so that a pair of via holes 34 align along each side of the board 46. On the board lower face 46b on which the ends of the via holes 34 are exposed, rectangular anode land electrode 32A and cathode land electrode 32B are disposed in parallel along each side of the board 46 so as to be electrically connected to their respective via holes 34. These four pairs of land electrodes 32 are cyclically arranged so that the anode land electrodes 32A and the cathode land electrodes 32B alternate with each other.

The lead conductors 30 are formed about their respective ends of the via holes 34 exposed at the board upper face 46a. The lead conductors 30 include anode lead conductors 30A and a cathode lead conductor 30B. The lead conductors 30A and 30B are electrically connected to their respective via holes 34. The cathode lead conductor 30B is integrally formed so as to include surroundings of the respective ends of the four via holes 34 electrically connected to the cathode land electrodes 32B, and to include the central portion of the board upper face 46a. The anode lead conductors 30A are formed about the four via holes 34 electrically connected to the anode land electrodes 32A, respectively, and each have a rectangular shape as with the land electrodes 32. The single cathode lead conductor 30B is electrically insulated from the four anode lead conductors 30A.

Also in the solid electrolytic capacitor 10B explained in the foregoing, the via holes 34 linearly extending in the thickness direction (Z direction in the drawing) of the board 46 connect the lead conductors 30 to the land electrodes 32. Therefore, as compared with a solid electrolytic capacitor in which an electric power is supplied to a capacitor element through a lead member having a bent portion, the conduction distance from the terminals on the circuit board to the electrodes (anodes 44b and cathode 28) of the capacitor element 12 becomes shorter, whereby the equivalent series inductance and impedance are accordingly reduced.

The present invention is not limited to the above-mentioned embodiments, and may be modified in various ways. For example, though aluminum is used as a material for valve metal supports, aluminum alloys, tantalum, titanium, niobium, zirconium, or their alloys may also be used to form the valve metal support in place of aluminum.

In the above-mentioned embodiments, the anode and cathode lead electrodes constituting lead electrode pairs are arranged symmetrically about the center of gravity of a foil-like aluminum support having a roughened surface. However, two pairs of lead electrodes disposed on opposing end portions of a valve metal support, respectively, may be arranged symmetrically about the center line thereof.

Namely, each of two opposing end portions of a foil-like aluminum support may be provided with a pair of lead electrodes, and the anode lead electrode of one pair of lead electrodes may be disposed at a position opposing the anode lead electrode of the other pair of lead electrodes. The conductive portion is not limited to a hollow via hole, but may have a structure in which, for example, the inside of a via hole is filled with an electrical conductor such as solder. Furthermore, the conductive portion may have other structures such as one in which a metal is applied to the surface of a cutout passing through the board at an edge thereof.

Though the solid electrolytic capacitors having eight terminals are explained in the above, the number of terminals is not limited thereto and may be increased or decreased.

Though the capacitor elements of a type in which the electrical storage 12a and the anodes 12b are integrated together are explained in the foregoing, the electrical storage 12a and the anodes 12b may be made separately and then joined together if the electric conduction can be established. For example, a capacitor element may have a configuration in which the electrical storage 12a is directly joined to the valve metal of the anodes 12b. Such a capacitor element can be obtained by roughening the whole surface of the electrical storage, forming a solid polymer electrolyte layer and others, peeling off part of the solid polymer electrolyte and others at a desirable position by a certain area, and then welding electrodes by ultrasonic welding or the like. In view of avoiding short-circuiting between the cathodes and the anodes, it is necessary to keep the solid electrolytic polymer layer and others from coming into contact with the anodes 12b by, for example, securing the sufficiently large peeled area mentioned above. This allows a capacitor element to be manufactured without preparing a resist to protect the electrodes as shown in FIGS. 3 and 9.

To further clarify advantageous effects of the present invention, some examples will be explained in the following.

FIRST EXAMPLE

A solid electrolytic capacitor similar to the solid electrolytic capacitor 10A shown in FIG. 6 was manufactured in the following manner.

First, from an aluminum foil sheet having a thickness of 100 μm roughened and formed with an aluminum oxide film, an aluminum foil was cut out in such a size that a cathode has an area of 0.75 $cm^2$. Subsequently, as shown in FIG. 3, a thermosetting resist was formed by a certain area on anode lead portions. The resist-processed aluminum foil was dipped in an aqueous solution of ammonium adipate prepared to yield a concentration of 3 wt % and a pH of 6.0, and a voltage was applied to the aluminum foil to form an aluminum oxide film at the cut end faces of the aluminum foil. This chemical conversion treatment was carried out under a condition with a chemical converting current density of 50 to 100 mA/$cm^2$ and a chemical converting voltage of 12 V. Next, a solid polymer electrolyte layer made of polypyrrole was formed in a cathode region by chemical oxidative polymerization. Here, the solid polymer electrolyte layer made of polypyrrole was formed in an ethanol/water mixed solution cell containing refined 0.1 mol/liter of pyrrole monomer, 0.1 mol/liter of sodium alkyl naphthalene sulfonate, and 0.05 mol/liter of iron sulfate (III). The mixture was stirred for 30 minutes to proceed with chemical oxidative polymerization, and the same operation was repeated three times. As a result, a solid polymer electrolyte layer having a maximum thickness of about 50 μm was obtained.

A carbon paste and a silver paste were successively applied onto the surface of thus laminated solid polymer electrolyte layer so as to form a cathode. Finally, the resist film formed on the anode lead electrode portions was removed.

Three solid electrolytic capacitors were prepared in the way mentioned above, and overlaid on each other as three laminated layers. Unroughened aluminum foils (valve metal foils) to be interposed between the electrodes were welded to their respective anodes using a 40 kHz ultrasonic welding machine manufactured by Branson Ultrasonics Div. of Emerson Japan Ltd. A silver epoxy conductive adhesive was used to electrically connect the capacitor elements to each other, and electrically connect the cathode of the lowest capacitor element to a cathode lead conductor of the board.

The unroughened aluminum foils fixed to the respective electrodes of the capacitor elements were welded and secured to the anode lead conductors of the board using a YAG laser spot welding machine manufactured by NEC. Further, the capacitor elements and the board were covered with an epoxy resin by injection or transfer molding, so as to make the above-mentioned solid electrolytic capacitor. Thereafter, by a known method, a predetermined voltage was applied to thus produced solid capacitor so as to carry out aging to sufficiently reduce leakage currents, and thus the solid electrolytic capacitor was completed.

For electric characteristics of thus obtained 8-terminal solid electrolytic capacitor #1, the capacitance and $S_{21}$ characteristic were measured using an impedance analyzer 4194A and a network analyzer 8753D manufactured by Agilent Technologies. According to thus obtained $S_{21}$ characteristic, an equivalent circuit simulation was performed to determine ESR and ESL values. As a result, the capacitance at 120 Hz was 325 μF, ESR at 100 kHz was 12 mΩ, and ESL was 150 pH. When the capacitance and the ESR and ESL values of a conventional solid electrolytic capacitor using a lead frame were measured by the same method, the capacitance at 120 Hz was 320 μF, ESR at 100 kHz was 14 mΩ, and ESL was 300 pH.

SECOND EXAMPLE

A solid electrolytic capacitor comprising three capacitor elements each shown in FIG. 7 was manufactured in the following way.

First, from an aluminum foil sheet having a thickness of 100 μm roughened and formed with an aluminum oxide film, an aluminum foil was cut out in such a size that a cathode has an area of 1 $cm^2$. Subsequently, as shown in FIG. 9, electrodes processed with a resist as in Example 1 were dipped in an aqueous solution of ammonium adipate prepared to yield a concentration of 3 wt % and a pH of 6.0, a voltage was applied to the aluminum foil to form an aluminum oxide film at cut end faces of the aluminum foil. This chemical conversion treatment was carried out under a condition with a chemical converting current density of 50 to 100 mA/$cm^2$ and a chemical converting voltage of 12 V. Next, a solid polymer electrolyte layer made of polypyrrole was formed by chemical oxidative polymerization in a region where a cathode electrode was to be placed. Here, the solid polymer electrolyte layer made of polypyrrole was formed in an ethanol/water mixed solution cell containing refined 0.1 mol/liter of pyrrole monomer, 0.1 mol/liter of sodium alkyl naphthalene sulfonate, and 0.05 mol/liter of iron sulfate (III). The mixture was stirred for 30 minutes to proceed with chemical oxidative polymerization, and the same operation was repeated three times. As a result, a solid polymer electrolyte layer having a maximum thickness of about 50 μm was obtained.

A carbon paste and a silver paste were successively applied onto the surface of thus laminated solid polymer electrolyte layer so as to form a cathode. Finally, the resist film was removed as in Example 1.

Three layers of solid electrolytic capacitors each made as mentioned above were laminated. Unroughened aluminum foils (valve metal foils) to be interposed between the electrodes were welded to their respective anodes using a 40 kHz ultrasonic welding machine manufactured by Branson Ultrasonics Div. of Emerson Japan Ltd. A silver epoxy conductive adhesive was used to electrically connect the cathode regions of the capacitor elements to each other, electrically connect the cathode region in the lowest capacitor element to a cathode lead conductor of the board, and the aluminum foils drawn out of the respective anodes of the capacitor elements were welded and secured to the anode lead conductors of the board using a YAG laser spot welding machine manufactured by NEC. Further, the capacitor elements and the board were covered with an epoxy resin by injection or transfer molding, so as to make the above-mentioned solid electrolytic capacitor. Thereafter, by a known method, a predetermined voltage was applied to thus produced solid capacitor so as to carry out aging to sufficiently reduce leakage currents, and thus the solid electrolytic capacitor was completed.

For electric characteristics of thus obtained 8-terminal solid electrolytic capacitor #2, the capacitance and $S_{21}$ characteristic were measured by using an impedance analyzer 4194A and a network analyzer 8753D manufactured by Agilent Technologies. According to thus obtained $S_{21}$ characteristic, an equivalent circuit simulation was performed, so as to determine ESR and ESL values. As a result, the capacitance at 120 Hz was 440 μF, ESR at 100 kHz was 13 mΩ, and ESL was 140 pH. When the capacitance and the ESR and ESL values of a conventional solid electrolytic capacitor using a lead frame were measured by the same method, the capacitance at 120 Hz was 435 μF, ESR at 100 kHz was 14.5 mΩ, and ESL was 200 pH.

INDUSTRIAL APPLICABILITY

The solid electrolytic capacitor in accordance with the present invention is able to achieve reduction in impedance.

The invention claimed is:

1. A solid electrolytic capacitor comprising:
a capacitor element including a plurality of anodes and a cathode;
a board having a first principal surface on which the capacitor element is mounted, and a second principal surface opposing the first principal surface;
a plurality of anode lead conductors and a cathode lead conductor provided on the first principal surface, each of the anode lead conductors being electrically connected to a respective one of the anodes, and the cathode lead conductor being electrically connected to the cathode; and
a plurality of anode lands disposed on the second principal surface at positions corresponding to respective anode lead conductors and a plurality of cathode lands disposed on the second principle surface at positions corresponding to the cathode lead conductor,
the board including at least either a first conductive portion passing through the board to electrically connect each of the anode lead conductors to a respective one of the anode lands or a second conductive portion passing through the board to electrically connect the cathode lead conductor to the cathode lands,
wherein the capacitor element further includes a support shaped in a thin rectangular plate and made of a valve metal, the support having a plurality of protrusions as the plurality of the anodes, the support having opposite principal surfaces covered with a continuous, electrically insulating film, and the cathode being provided on the insulating film,
wherein the plurality of the anode lead conductors are provided on the first principal surface of the board, and
wherein the cathode lead conductor has a first portion placed under the support and a plurality of second portions protruding from the first portion, the first portion being electrically connected to the cathode, and the second portions and the anode lead conductors being arranged alternately.

2. A solid electrolytic capacitor according to claim 1, wherein the first conductive portion includes a hole passing through the board, and an electrical conductor disposed in the hole to extend between one of the anode lead conductors and a respective one of the anode lands.

3. A solid electrolytic capacitor according to claim 2, wherein the support does not have a plurality of protrusions electrically connected to the second portions of the cathode lead conductor, respectively.

4. A solid electrolytic capacitor according to claim 2, wherein the cathode lead conductor is electrically connected to the cathode only at the first portion.

5. A solid electrolytic capacitor according to claim 1, wherein the second conductive portion includes a hole passing through the board, and an electrical conductor disposed in the hole to extend between the cathode lead conductor and the cathode lands.

6. A solid electrolytic capacitor according to claim 5, wherein the support does not have a plurality of protrusions electrically connected to the second portions of the cathode lead conductor, respectively.

7. A solid electrolytic capacitor according to claim 5, wherein the cathode lead conductor is electrically connected to the cathode only at the first portion.

8. A solid electrolytic capacitor according to claim 1, wherein a plurality of the capacitor elements are disposed adjacent to each other, respective ones of the anodes of the capacitor elements are electrically connected to each other, and the cathodes of the capacitor elements are electrically connected to each other.

9. A solid electrolytic capacitor according to claim 8, wherein the anodes of the capacitor elements are electrically connected to each other via a valve metal.

10. A solid electrolytic capacitor according to claim 9, wherein the valve metal includes a portion held between the anodes of the capacitor elements, and a portion connected to the anode lead conductors.

11. A solid electrolytic capacitor according to claim 10, wherein the support does not have a plurality of protrusions electrically connected to the second portions of the cathode lead conductor, respectively.

12. A solid electrolytic capacitor according to claim 10, wherein the cathode lead conductor is electrically connected to the cathode only at the first portion.

13. A solid electrolytic capacitor according to claim 9, wherein the support does not have a plurality of protrusions electrically connected to the second portions of the cathode lead conductor, respectively.

14. A solid electrolytic capacitor according to claim 9, wherein the cathode lead conductor is electrically connected to the cathode only at the first portion.

15. A solid electrolytic capacitor according to claim 8, wherein the cathodes of the capacitor elements are electrically connected to each other with an electrically conductive adhesive.

16. A solid electrolytic capacitor according to claim 15, wherein the support does not have a plurality of protrusions electrically connected to the second portions of the cathode lead conductor, respectively.

17. A solid electrolytic capacitor according to claim 15, wherein the cathode lead conductor is electrically connected to the cathode only at the first portion.

18. A solid electrolytic capacitor according to claim 8, wherein the support does not have a plurality of protrusions electrically connected to the second portions of the cathode lead conductor, respectively.

19. A solid electrolytic capacitor according to claim 8, wherein the cathode lead conductor is electrically connected to the cathode only at the first portion.

20. A solid electrolytic capacitor according to claim 1, wherein the support does not have a plurality of protrusions electrically connected to the second portions of the cathode lead conductor, respectively.

21. A solid electrolytic capacitor according to claim 1, wherein the cathode lead conductor is electrically connected to the cathode only at the first portion.

* * * * *